UNITED STATES PATENT OFFICE.

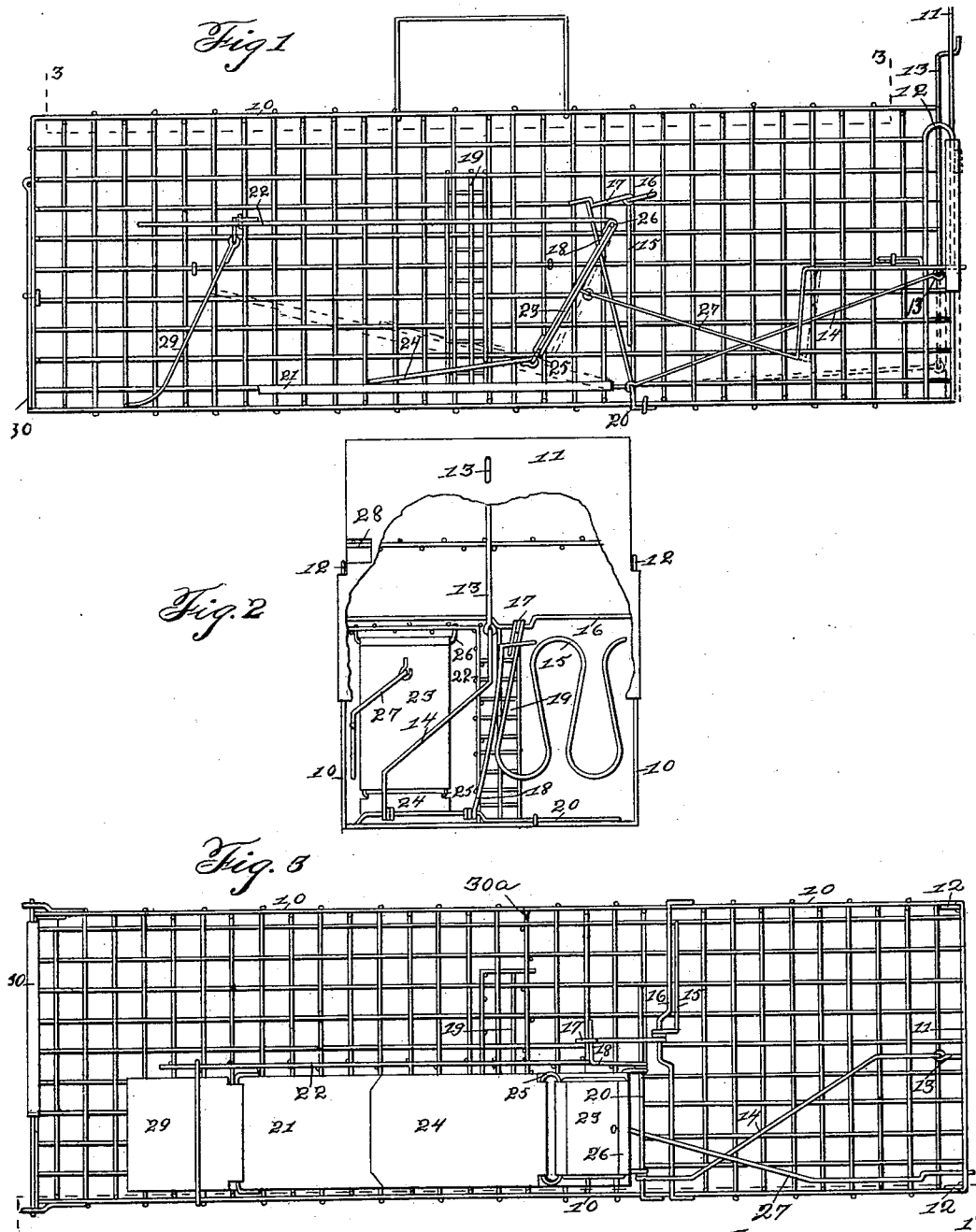

JUAN F. HAND, OF DES MOINES, IOWA.

AUTOMATIC ANIMAL-TRAP.

SPECIFICATION forming part of Letters Patent No. 676,623, dated June 18, 1901.

Application filed April 9, 1900. Serial No. 12,078. (No model.)

*To all whom it may concern:*

Be it known that I, JUAN F. HAND, a citizen of the United States, residing at Des Moines, in the county of Polk, in the State of Iowa, have invented a new and useful Improvement in Automatic Animal-Traps, of which the following is a specification.

The object of my invention is to provide a trap of such a character that when once set it may be actuated by an animal within the trap first to close the same, thus preventing the escape of the animal, and next to place the trap in readiness to receive another, still retaining the animal already within the trap, all mechanism to be operated by the animal within the trap.

My invention consists in the arrangement within a box or cage of a vertical partition separating the same into two compartments, a passage between these compartments, a door at the opening of the trap adapted to be both opened and closed by the action of an animal within the trap, as required, first, to detain the animal, and, secondly, to admit another animal, a tripping device to hold the door in an open position or to release the same, a tilting platform adapted to open the door and situated within the passage between two compartments of the trap, said passage provided with guards adapted to allow the passage of an animal through it into the second compartment of the trap and to prevent its return through the same; and particularly does my invention consist in the arrangement of a latch or locking device adapted to automatically lock the door when closed and so arranged and combined as to be automatically released at such a time as the confined animal has reached such a position in the trap that the opening of the door will not make it possible to escape from the trap, (as specifically when the animal has entered the passage where it is confined and where its movements result in throwing the lock out of engagement with the door and opening same,) and in the arrangement of certain other features, as hereinafter set forth, pointed out in my claims, and illustrated in the accompanying drawings, in which—

Figure 1 is a longitudinal sectional view of the trap through the line 1 1 of Fig. 3, showing the mechanism in the position occupied when the trap is set, with dotted lines indicating the position of the movable parts when the trap is closed. Fig. 2 shows a front elevation of the trap with a part of the door broken away to show the mechanism within the trap. Fig. 3 shows a longitudinal sectional view taken on a horizontal plane through the line 3 3 of Fig. 1.

Referring to the accompanying drawings, the numeral 10 indicates the frame or cage. 11 indicates the door at the front of same, which moves in a vertical plane upon the guides 12 12.

13 indicates a pin in the door engaged by a lever 14, by which the door is held in an elevated position when the trap is set.

15 indicates a swinging guard pivotally mounted upon the support or bar 16 and provided with a horizontal extension 17, which engages the end of a vertical arm 18. When the trap is set, the guard 15 stands in a vertical position at a suitable distance from the bait in the box 19, so that an animal approaching the bait will bear against the guard, pushing it into the position indicated by the dotted lines, thus raising the extended arm 17 and releasing the arm 18, which being rigidly connected to the lever 14, pivotally mounted upon the support 20, assumes the position indicated by dotted lines, thus allowing the door 11 to fall by force of gravity, thus closing the opening to the cage.

Rigidly connected with lever 14 and the arm 18 is the tilting platform 21, which is raised by the weight of the door when it closes or falls, thus being thrown into an elevated position, as indicated by dotted lines, simultaneously with the release of the arm 18 and the fall of the door 11. This lever or tilting platform is situated within the passage 22, at the entrance to which is located the swinging guard 23, having a laterally-extended guard 24, connected therewith by a hinge-joint 25, said guard being pivotally mounted upon the support 26, situated at the upper part of the entrance to the passage 22.

While the platform 21 is in the horizontal position it will be seen that the swinging guard 23 inclines rearwardly; but when the mechanism is released the door 11 falls and the tilting platform 21 is raised, which throws the extreme end of the lateral extension of the hinged guard 23 upwardly and toward the front of the trap, by which the swinging guard is thrust into a substantially vertical position, as indicated by dotted lines. By this movement the rod 27, which is attached to the swinging guard 23, is thrown in a longitudinal direction, so that its extreme end is thrust over the shoulder 28 of the door 11, as indicated by dotted lines, thus locking the door and holding it in a closed position and preventing the escape of the animal, which now being confined in the first compartment of the trap attempts to escape and finding no means of egress elsewhere forces its way through the swinging guard 23 at the entrance to the passage 22. By the movement thus imparted to the swinging guard 23 it will be seen that the rod or bar connected therewith is withdrawn from engagement with the shoulder 28 of the door 11. The weight of the animal being thus thrown upon the tilting platform 21, the lever 14 is raised and the door thrown open for the admission of another animal. The entrapped animal having now passed the guard 23 is confined within the passage 22, where its weight upon the tilting platform opens the door, as stated, simultaneously with which the vertical arm 18 is thrown into engagement with the horizontally-extended arm 17 of the catch or trip mechanism. Thus the guard 15 is again brought into position to be actuated by another animal, the whole mechanism being held in position by the extended arm 17. The animal now being unable to escape from the passage by the way it entered forces its way through the pivotally-mounted door 29 at the rear end of the passage, which rises to admit it and immediately falls by force of gravity into its normal position. The animal is now confined in the rear of the trap by means of the vertical partition 30ª, by which the cage is divided into compartments. For the release of the animal the door 30 is provided.

In practical operation the trap is placed in a desirable location, provided with bait, and set. An animal entering the open door seeks to approach the bait and coming in contact with the guard 15 presses it into an inclined position toward the bait, thus raising the extended arm or trip device 17, which releases the vertical arm 18, when the weight of the door 11 causes it to descend with the arm of the lever 14, which simultaneously raises the tilting platform 21, whereby the swinging guard 23 is thrown toward the front of the trap, thus thrusting the rod or bar 27 into engagement with the shoulder 28 in the door 11, by which it is held in a closed position. The animal is now entrapped and in seeking to escape presses against the swinging guard 23, which rises, permitting it to enter the passage. The movement thus imparted to the swinging guard withdraws the rod connected therewith from engagement with the door. The animal is now within the passage upon the tilting platform 21, which is forced downwardly from its elevated position by the weight bearing upon it, thus raising the lever 14 and elevating the door 11. The animal having thus entered the passage, the swinging guard 23 falls into position, thus preventing the return of the animal through the entrance to the passage 22. Being thus confined in the passage and seeking a way of escape, it presses against the swinging door 29, raises it, and passes into the second compartment of the trap, when the door pivotally connected at the top of the passage falls again into place by force of gravity, thus preventing the animal from returning through it. The animal is now confined in the second compartment and the trap ready for the admission of a second animal.

Having thus described the construction and operation of my invention, its use and utility will be obvious, and what I claim as new, and desire to have protected by Letters Patent of the United States, is—

1. An improved animal-trap comprising a cage, a partition to divide the same into two compartments, a closed passage-way between the compartments of a size sufficient to contain the animal being trapped, a vertically-movable gravity-actuated door in the first compartment, means in said first compartment to be actuated by the animal for releasing the door, a tilting platform in said passage-way, means connected with said tilting platform to automatically open the said door when the platform is depressed by an animal, and to automatically raise said platform when the door closes or falls, a swinging guard at the entrance to said passage-way, means connected with said swinging guard whereby the door is automatically locked when closed for the purposes stated.

2. In an animal-trap in combination with a box or cage, a vertical partition separating the same into two compartments, a closed passage between the said compartments, a vertically-movable door actuated by gravity, an arm or lever adapted to engage said door, a vertically-extended arm rigidly connected with said lever, pivotal bearings to support said arm and lever, a tripping device or catch to engage said vertically-extended arm, pivotal bearings to support said tripping device, a depending guard rigidly connected with said tripping mechanism, said guard located a suitable distance from and in proper relation to the bait-cage, a tilting platform rigidly connected with said lever and vertical arm and mounted upon said bearings, said platform located within said passage between said compartments of the trap, and so connected with said door as to occupy an elevated position when the door is closed, and vice versa, a swinging guard situated at the entrance of this passage, pivotally connected at the top thereof and having a lateral and rearwardly-extending guard connected therewith by hinged joint, pivotal bearings for the support of said guard, a rod or bar connected with said swinging guard, a guard at the extreme end of said passage (pivotally mounted), bearings to support said guard; all arranged and combined to operate in the manner set forth, and for the purposes stated, substantially as described.

3. In an animal-trap, the combination of a box or cage, a vertical partition separating the same into two separate compartments, a closed passage-way connecting said compartments, a suitable door at the entrance to said box or cage, means for elevating said door and retaining it in an elevated position, and means for the release of said door, a swinging guard at the entrance of said passage, a rod or bar connected with said guard, a tilting platform within said passage, pivotal bearings for the same at the entrance to said passage, a vertically-extending arm rigidly connected with said platform, a lever rigidly connected with said platform engaging said door, a catch or trip rigidly connected with a depending guard, bearings to support the same and a swinging guard situated at the extreme end of said passage with bearings to support the same, all to be actuated by an animal within the trap in the manner set forth and for the purposes stated, substantially as described.

JUAN F. HAND.

Witnesses:
C. V. SAYRE,
J. RALPH ORWIG.